United States Patent
Wilson et al.

(10) Patent No.: US 10,345,106 B1
(45) Date of Patent: Jul. 9, 2019

(54) TRAJECTORY ANALYSIS WITH GEOMETRIC FEATURES

(71) Applicant: National Technology & Engineering Solutions of Sandia, LLC, Albuquerque, NM (US)

(72) Inventors: Andrew T. Wilson, Albuquerque, NM (US); Mark Daniel Rintoul, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 827 days.

(21) Appl. No.: 14/927,083

(22) Filed: Oct. 29, 2015

(51) Int. Cl.
*G01C 21/20* (2006.01)

(52) U.S. Cl.
CPC .................. *G01C 21/20* (2013.01)

(58) Field of Classification Search
CPC ........................................................ G01C 21/20
See application file for complete search history.

(56) References Cited

PUBLICATIONS

Ferreira et al., "Vector Field k-Means: Clustering Trajectories by Fitting Multiple Vector Fields" 2012—https://arxiv.org/abs/1208.5801.*
Hurter et al., "FromDaDy: Spreading Aircraft Trajectories Across Views to Support Iterative Queries" 2009 IEEE Transactions on Visualization and Computer Graphics, vol. 15, No. 6, Nov./Dec. 2009.*
Van der Stigchel, Eye movement trajectories and what they tell us. Neuroscience & Biobehavioral Reviews, 30(5), 666-679.*
Gariel et al.,"Trajectory Clustering and an Application to Airspace Monitoring", IEEE Transactions on Intelligent Transportation Systems, vol. 12, No. 4, Dec. 2011 (Year: 2011).*
Dominic J. Diston, "Computational Modelling and Simulation of Aircraft and the Environment", 2009 Wiley Chapter 3 pp. 63-136 (Year: 2009).*
Confesor Santiago et al., Systematic Visualization Suite for En Route Air Traffic Flows and Flight Encounters, Journal of Aerospace Information Systems vol. 10, No. 2, Feb. 2013 (Year: 2013).*

(Continued)

*Primary Examiner* — Regis J Betsch
(74) *Attorney, Agent, or Firm* — Medley, Behrens & Lewis, LLC

(57) ABSTRACT

Described herein are various technologies pertaining to extracting one or more features from trajectory data recorded during motion of a body, and further, generating a n-dimensional feature vector based upon the one or more extracted features. The n-dimensional feature vector enables expedited analysis of the trajectory data from which the feature vector was generated. For example, rather than having to analyze a trajectory curve comprising a large number of time-position data points, the n-dimensional feature vector can be compared with one or more search parameters to facilitate clustering of the trajectory data associated with the n-dimensional feature vector with other trajectory data which also satisfies the search request. The trajectory data can be plotted on a screen in combination with the n-dimensional feature vector, and other pertinent information. The trajectory data, etc., can be displayed using heat maps or other graphical representation.

14 Claims, 4 Drawing Sheets

(56) References Cited

PUBLICATIONS

Santiago, et al., "Systematic Visualization Suite for En Route Air Traffic Flows and Flight Encounters", Journal of Aerospace Information Systems, vol. 10, No. 2, Feb. 2013, pp. 87-97.
Hurter et. al., "FromDaDy: Spreading Aircraft Trajectories Across Views to Support Iterative Queries", IEEE Transactions on Visualizations and Computer Graphics, vol. 15, Issue 6, Nov.-Dec. 2009, pp. 1017-1024.
Ferreira, et al., "Vector Field k-Means: Clustering Trajectories by Fitting Multiple Vector Fields", Eurographics Conference on Visualization (EuroVis) 2013, vol. 32, No. 3, 2013, pp. 1-10.
"Flight Patterns", Retrieved at: <<http://www.aaronkoblin.com/work/flightpatterns/index.html>>, Retrieval Date: Jun. 30, 2015, pp. 1-3.
Naftel et al., "Motion Trajectory Learning in the DFT-Coefficient Feature Space", IEEE 4th International Conference on Computer Vision Systems—ICVS 2006, 2006, pp. 1-8.

* cited by examiner

TRAJECTORY ANALYSIS WITH GEOMETRIC FEATURES

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Trajectory data for a moving body comprises huge amounts of data to enable plotting/reproduction of a trajectory for which the data has been collected. For example, trajectory data for an aircraft that flew internationally and further was placed in a lengthy holding pattern prior to landing can comprise hundreds/thousands of data points. When trajectory data is compiled for a plurality of aircraft flights occurring for a particular duration, e.g., monitoring all flights arriving at a particular airport for a year, the total trajectory data can collectively include billions of data points. Accordingly, analysis of the trajectory data to identify, for example, flights having a similar flight path, can be computationally intensive. Further, "noise" in the trajectory data can imbue the trajectory data with a level of uncertainty that can skew analysis of the data.

SUMMARY

The following is a brief summary of subject matter that is described in greater detail herein. This summary is not intended to be limiting as to the scope of the claims.

Described herein are various technologies related to extracting one or more features from trajectory data recorded during motion of a body, and further, generating a n-dimensional feature vector based upon the one or more extracted features. The n-dimensional feature vector enables expedited analysis of the trajectory data from which the feature vector was generated. For example, rather than having to analyze a trajectory curve comprising a large number of time-position data points, the n-dimensional feature vector can be compared with one or more search parameters to facilitate clustering of the trajectory data associated with the n-dimensional feature vector with other trajectory data which also satisfies the search request. The trajectory data can be plotted on a screen in combination with the n-dimensional feature vector, and other pertinent information. The trajectory data, etc., can be displayed using heat maps or other graphical representation.

Conventional analysis of trajectory data may require the trajectory curve to be assembled from the trajectory data, and subsequently perform curve analysis of the trajectory curve. However, such an approach can be computationally costly. By generating a n-dimensional feature vector for the trajectory data, any analysis of the trajectory data can be performed based upon analysis of the one or more features from which the n-dimensional feature vector was formed. For example, trajectory data for an international flight can include millions of data points, while it may be possible to extract 17 features from the trajectory data, a 17-dimensional feature vector can be generated from the extracted features, and subsequently, only the 17-dimensional feature vector has to be analyzed as opposed to the millions of data points for the trajectory.

In an embodiment, the n-dimensional feature vector enables the trajectory data from which it was formed to be clustered with other trajectory data. For example, a request can be received at the computer system, requesting trajectories to be found that match a particular requirement (e.g., total distance of flight, including any holding patterns, flight path diversions, etc.). Alternatively, the generated n-dimensional feature vector can be compared with another n-dimensional feature vector to determine whether the generated n-dimensional feature vector and the n-dimensional feature vector are the same/similar, or not. In the event of the generated n-dimensional feature vector and the n-dimensional feature vector being comparable, the n-dimensional feature vector can be "clustered" with the generated n-dimensional feature vector. A notification can be generated indicating whether a n-dimensional feature vector(s) was identified to match the generated n-dimensional feature vector, or no comparable n-dimensional feature vector was found.

In a further embodiment, one or more trajectories can be presented on a display device, wherein graphical representation techniques such as a heatmap can be utilized to provide further information about a trajectory/trajectories. Other representation of a trajectory can be utilized such as a received instruction defining one or more colors for which a trajectory (or portion thereof) is to be presented on a display device. Such instructions can include line width of a line depicting the trajectory, a first color for a first portion of a trajectory, a second color for a second portion of the trajectory, coloration indicating a degree of measure, e.g., different line color for maximum altitude of a trajectory, etc.

In another embodiment, one or more algorithms can be utilized to control presentation of a trajectory, wherein the one or more algorithms can adjust display of a trajectory based upon a position of the earth over which the trajectory was recorded (e.g., latitude/longitude correction), to compensate for one or more characteristics of the display device, e.g., a display device having a two dimensional display surface compared with presentation on a display device having a spherical display surface.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
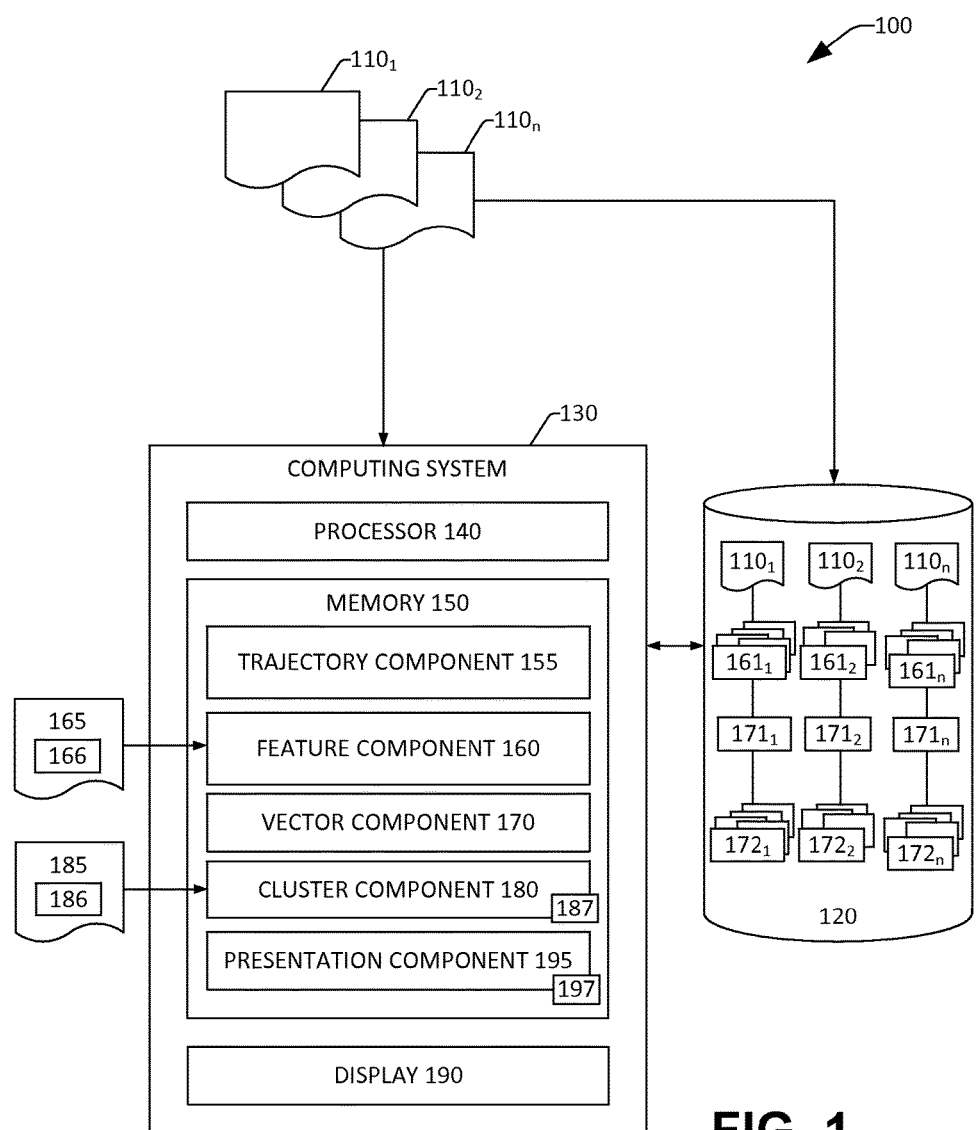
FIG. 1 is a schematic illustrating an exemplary system for conversion of trajectory data to a n-dimensional feature vector and analysis of one or more n-dimensional vectors.

Various technologies are presented herein pertaining to vector representation of trajectory data, and various operations that can be performed on the vector representation, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

FIG. 1 illustrates an exemplary system 100 that can be utilized to generate a vector representation of trajectory data, and further conduct one or more operations with the vector representation. Trajectory data comprises a set of points in time and space (e.g., time-series positional coordinates) from which a trajectory, or motion, of a body can be presented (e.g., on a display). The system 100 comprises a plurality of data instances compiled for a plurality of trajectories captured for motions of one or more bodies, data $110_1$-$110_n$, where n is an integer greater than 1. The bodies can be any object that has undergone/undergoing motion, such as an aircraft, a watercraft, a vehicle, a person, an animal, a ball, a projectile, an object, etc. Also, the trajectory can be data captured relating to motion of an eyeball with regard to one or more objects presented on a display screen and the according focus of attention on a particular coordinate(s) of the display screen (e.g., gaze tracking), where the one or more objects are statically placed on or are in motion across the display screen. For example, such trajectory data can be captured by an entity placing one or more advertisements on a screen and gaze tracking is performed to determine an interest of a viewer with respect to the one or more advertisements presented on the display screen. As previously mentioned, a large volume of data (e.g., millions of datapoints) can be compiled for motion of a body along a given trajectory, and thus, analysis of trajectory data compiled for a large number of bodies can be computationally intense. As shown in FIG. 1, the trajectory data $110_1$-$110_n$ can be stored in a data store 120. Each of the trajectory data $110_1$-$110_n$ can be in any format, e.g., text, extensible markup language (XML), comma separated value (CSV), etc.

The system 100 further comprises a computing system 130 which can be configured to receive and/or retrieve trajectory data $110_1$-$110_n$, e.g., from the data store 120.

The computing system 130 comprises a processor 140 and memory 150, wherein the memory 150 comprises data that is accessible to the processor 140 and instructions that can be executed by the processor 140. With more particularity, the memory 150 comprises a trajectory component 155 that is configured to perform one or more functions on an instance of trajectory data (e.g., any of trajectory data $110_1$-$110_n$). For example, the trajectory component 155 can provide one or more identifiers/labels to the trajectory data, such as departure location, destination location, flight number, ship number, vehicle identification number, name of person being monitored, a timestamp for duration of motion, motion start time, motion end time, etc. Further, the trajectory component 155 can review an instance of trajectory data to determine whether the trajectory data comprises a single journey (or motion) of a body, or a plurality of journeys. For example, the trajectory component 155 can review an instance of trajectory data to determine whether the body was at rest for a certain amount of time, and rather than the body being considered to have undertaken one journey (per the single instance of trajectory data), the trajectory data includes more than one journey for the body. For example, if a body is at rest for longer than a definable time period, TP, (e.g., TP=20 minutes) then the trajectory data is determined to include a first journey, a rest duration, and a second duration. The trajectory component 155 can be configured to separate the trajectory data into two portions, a first portion for the first journey and a second portion for the second journey, and apply any pertinent identifiers (e.g., flight number) to both the first portion and second portion of trajectory data. The instances of trajectory data $110_1$-$110_n$ can be updated to include the newly created second portion, e.g., as $110_x$.

The memory further comprises a feature component 160 that is configured to identify, generate and/or extract one or more features $161_1$-$161_n$ from an instance of trajectory data, e.g., any of trajectory data $110_1$-$110_n$. A feature is a parameter or quality which is included in, or can be determined from data points (e.g., time-position series of points recorded for a trajectory) included in an instance of trajectory data. A value can be ascribed to a feature. For example, a feature "highest altitude" can be obtained from trajectory data obtained for a flight of an aircraft, wherein the highest value in the time-position series of points in the trajectory data (e.g., 27,000 feet) can be identified and assigned to the highest altitude feature. Thus, trajectory data can be processed by the feature component 160, with one or more features being extracted, which can be further utilized to identify a trajectory having a particular characteristic(s).

The one or more features $161_1$-$161_n$ can be user defined. For example, a user can identify 12 features (parameters) that they would like the respective trajectory data (e.g., any of trajectory data $110_1$-$110_n$) to be represented be a feature vector, hence the generated feature vectors will be 12-dimensional feature vectors. A feature request 165 can be received at the feature component 160, wherein the feature request 165 includes the 12 required features in definition 166. The feature component 160 can be configured to extract the 12 required features from the trajectory data.

The memory 150 also comprises a vector component 170 that is configured to generate an n-dimensional feature vector from the one or more features extracted (e.g., per the feature request 165) for an instance of trajectory data, e.g., any of the features $161_1$-$161_n$. For example, the vector component 170 generates a first n-dimensional feature vector $171_1$ from the features $161_1$ extracted for trajectory data $110_1$, a second n-dimensional feature vector $171_2$ from the features $161_2$ extracted for trajectory data $110_2$, an $n^{th}$ n-dimensional feature vector $171_n$ from the features $161_n$ extracted for trajectory data $110_n$. The n-dimensional feature vectors $171_1$-$171_n$ can be stored in the data store 120 for subsequent retrieval and analysis.

The trajectory component 155, the feature component 160 and/or the vector component 170 can be configured to read the trajectory data $110_1$-$110_n$ in its original format (e.g., text, CSV, etc.) and generate the n-dimensional feature vectors $171_1$-$171_n$.

The memory 150 further comprises a cluster component 180 that is configured to receive a search request 185, analyze the n-dimensional feature vectors $171_1$-$171_n$ (e.g., stored in the data store 120), and further determine whether any of the n-dimensional feature vectors $171_1$-$171_n$ satisfies the search request 185. In response to determining that one or more of the n-dimensional feature vectors $171_1$-$171_n$ satisfy the search request 185, any of the one or more of the n-dimensional feature vectors $171_1$-$171_n$ which satisfy the search request 185 can be "clustered" with (associated with, stored with, combined with, attached to) the search request 185. For example, the search request 185 comprises a search criteria 186 "do any of the n-dimensional feature vectors $171_1$-$171_n$ have the same or similar n-dimensional feature vector as a search feature vector x?" Wherein, any of the n-dimensional feature vectors $171_1$-$171_n$ which meet the search criteria 186 can be clustered with the search feature vector x, and any information pertaining thereto. The cluster component 180 can be further configured to, in response to determining that one or more n-dimensional feature vectors $171_1$-$171_n$ were classified as being the same as/similar to the n-dimensional feature vector 186, generate an indicator 187 as to which of the n-dimensional feature vectors $171_1$-$171_n$ were classified as being the same as/similar to the n-dimensional feature vector 186. The cluster component 180 can also be configured to, in response to determining that none of the n-dimensional feature vectors $171_1$-$171_n$ were classified as being the same as/similar to the n-dimensional feature vector 186, generate an indicator 187 reciting that no matches were found for the n-dimensional feature vector 186. Generation and storage of a "no matches found" indicator 187 can expedite a subsequent search as a message can be presented to a user submitting a search request 185 that a previously executed search request contained search criteria similar to search criteria 186, and no matches were found.

In another search example, the search request 185 can include a criteria 186 to identify (cluster) flights that have a particular duration, a particular flight distance, etc., where such requests can be complied with by the cluster component 180 reviewing one or more of the features $161_1$-$161_n$ extracted from one or more instances of trajectory data $110_1$-$110_n$.

The computing system 130 further comprises a display 190 that is in communication with the processor 140, wherein the display 190 can display data, information, etc., pertaining to an n-dimensional feature vector, the trajectory data from which it was generated. The memory 150 comprises a presentation component 195 which is configured to control how an n-dimensional feature vector, the trajectory data from which it was generated, extracted features, and other pertinent data/information are presented on the display 190.

Operation of the system 100 is now set forth. As previously mentioned, trajectory data can include a very large amount of data (e.g., data comprises points in space and time) to enable depiction of the trajectory on a display (e.g., display 190). Hence, comparison between first trajectory data describing/depicting motion of a first body and second trajectory data describing/depicting motion of a second body can be computationally intensive. Further, while two trajectories may be similar for a large portion of the respective trajectories, for a particular portion the trajectories may be sufficiently dissimilar that an automated search system would not consider the two trajectories to be related, even though the two flights utilized the same departure airports and the same destination airports. For example, a first aircraft flies directly from a departure airport to a destination airport. However, a second aircraft has its flight undertake a detour (e.g., to avoid bad weather) and further, may have been placed in a lengthy holding pattern prior to landing. Hence, direct comparison of the first trajectory and the second trajectory could determine the two trajectories to be different.

Thus, rather than directly comparing first trajectory data with second trajectory data, an approach is required to reduce the complexity of such comparison. As mentioned, a feature component 160 can be configured to generate one or more features from a set of trajectory data, wherein the one or more features can be considered to be metadata of respective trajectory data. Features comprise numerical values associated with one or more parameters of interest for the trajectory data. For example, in a non-exhaustive list, features can include: an end-to-end distance of the flight, a total distance traveled (length of trajectory), distance from a given fixed point or set of points, a starting point, an end point, a start timestamp, an end timestamp, a timestamp for duration of motion, speed of motion, average speed of motion, maximum speed of motion, heading(s), a vehicle identifier (e.g., an aircraft tail number/empennage number, an aircraft fuselage number, a ship identification number, a vehicle registration plate), climb rate, a centroid of points, a total curvature, a total turning average, curvature average, turning area of a convex hull of the points, aspect ratio of a convex hull, perimeter length of a convex hull, centroid of a convex hull, ratio of end-to-end distance vs. total distance traveled, radius of gyration of the points, intratrajectory distances (distance geometry approaches), etc. The various points (e.g., starting point, end point, etc.) can be represented by any suitable representation, e.g., longitude coordinate, latitude coordinate, etc.

A number of the features $161_1$-$161_n$ are derived data $172_1$-$172_n$, that is derived from the trajectory data $110_1$-$110_n$. For example, climb rate for an aircraft may not be known directly and rather is derived based upon analyzing a number of points comprising the trajectory data $110_1$-$110_n$. Any derived data $172_1$-$172_n$, e.g., the derived climb rate, can be attached to the various data points that were utilized to obtain the derived data $172_1$-$172_n$. For example, a series of points in trajectory data $110_1$ are utilized to compute a climb rate, which is stored as derived data $172_1$, and hence, the series of points in trajectory data $110_1$ can be assigned the climb rate derived data $172_1$.

The vector component 170 can generate an n-dimensional feature vector based upon the features identified/determined for a particular set of trajectory data, e.g., an n-dimensional feature vector $171_1$ for trajectory data $110_1$. Once a trajectory is described by the various available features (e.g., from respective features $161_1$-$161_n$), or a subset thereof, a particular trajectory of a body can be described as a point in n-dimensional space, where n is the number of features used to describe the trajectory. For example, if n-dimensional feature vector $171_1$ is generated with n=9 features (e.g., features $161_1$ comprise a minimum of 9 features), the trajectory data $110_1$ can now be analyzed as a function of a 9-dimensional feature vector, as opposed to the hundreds (thousands, or more) space/time points comprising the trajectory data $110_1$. Further, by expressing trajectory data as an n-dimensional feature vector, any noise effects in the trajectory data can be minimized or negated.

As previously mentioned, once trajectory data is represented as an n-dimensional feature vector, a plurality of operations can be performed which can be computationally difficult/complex to perform on trajectory data alone. For example, the cluster component 180 can compare a plurality of n-dimensional feature vectors (e.g., any of $171_1$-$171_n$), and those n-dimensional feature vectors satisfying particular criteria (e.g., nearest-neighbor, similarity, x-number of features are the same, etc.) those identified n-dimensional feature vectors can be clustered/grouped into bins of similar/related features. In another embodiment, the cluster component 180 can compare one or more points in the n-dimensional feature vectors generated for a plurality of trajectories and identify outlier trajectories based upon points/clusters of points that are a particular distance (e.g., a threshold distance) away from an average value/grouping of points.

Further, the cluster component 180 can be configured to, for any particular n-dimensional feature vector, retrieve (e.g., from data store 120) the trajectory data pertaining to the n-dimensional feature vector. For example, if the n-dimensional feature vector $171_2$ is determined to be of interest, the cluster component 180 can retrieve the trajectory data $110_2$. The presentation component 195 can be configured to present both the values from which the n-dimensional feature vector is formed, as well as the trajectory data (e.g., in the form of a 2 dimensional representation on a display screen).

Further, the n-dimensional feature vectors can be exported to a database (e.g., in data store 120, or an external database, not shown) to enable comparisons between large data sets (e.g., many trajectories) to be performed expeditiously, with minimal computational complexity.

A plurality of software/programming languages can be utilized for the various embodiments presented herein, enabling advantage(s) to be taken of the various processing/operational benefits of a particular software language in a software library. For example, Python programming language can be utilized to process the trajectory data $110_1$-$110_n$ to generate the n-dimensional feature vectors $171_1$-$171_n$. Hence, the feature component 160 and the vector component 170 can be configured to utilize Python programming language. The cluster component 180 and the presentation component 195 can be configured to be programmed utilizing the C++ programming language, wherein advantage can be taken of the ability of the C++ programming language to analyze the various features (e.g., points, trajectories, timestamps, etc.) extracted by the feature component 160 and also the n-dimensional feature vectors $171_1$-$171_n$. Accordingly, advantage can be taken of the C++ programming language with regard to generation of fast analysis algorithms and powerful tools for numerical computation. The Python programming language can be considered to be a "glue" code, enabling smooth interaction between any of the components, e.g., the feature component 160, the vector component 170, the cluster component 180, and/or the presentation component 195. Compilation of the respective programs written with the respective programming languages generates machine code that can be processed by the processor 140, and any other components comprising system 100. It is to be appreciated that while the foregoing discloses Python and C++ programming languages, any programming language can be utilized to facilitate one or more of the embodiments presented herein.

As previously mentioned a presentation component 195 can be utilized to control how any of a trajectory, a feature, other data or information is represented on the display 190. For example, the presentation component 195 can render a plurality of trajectories with one or more graphical representations such as a heat map, a fractal map, a tree map, a choropleth map, etc. E.g., different colors can be utilized to indicate which airport(s) may have a high volume of activity (e.g., based upon number of departures, based upon number of arrivals, etc.) compared to those airports having lesser activity.

Alternatively, a color progression can be utilized by the presentation component 195 to indicate trajectory direction, e.g., at the departure point the trajectory is colored blue, but as the trajectory reaches the destination point the trajectory is colored red. Further, line coloration can be utilized to indicate climb rate, highest altitude, cruising altitude (e.g., level flight), etc.

The presentation component 195 can utilize any technique to plot a trajectory, data, feature, etc., on the display screen 190. For example, line width (thickness) of a trajectory can be utilized to indicate a particular feature, such as the line width is thickened as the trajectory reaches its cruising altitude.

Further, the presentation component 195 can present other information of a map over which the trajectories are presented. For example, other information can include international boundaries, state/local boundaries, cities, land mass(es), ocean(s), etc.

Furthermore, the presentation component 195 can be utilized to generate a movie comprising one or more trajectories $110_1$-$110_n$, features $161_1$-$161_n$, n-dimensional feature vectors $171_1$-$171_n$, and any other pertinent information. Hence, for a series of intervals in time the various data points which comprise the trajectory data $110_1$-$110_n$ can be plotted (e.g., connected by a trajectory line). The movie can be saved in a suitable format, e.g., a movie file format.

As previously mentioned, derived data $172_1$-$172_n$ can be generated from the trajectory data $110_1$-$110_n$. The presentation component 195 can be configured to receive one or more instructions on how the derived data $172_1$-$172_n$ (and any associated data, trajectory data $110_1$-$110_n$, etc.) is to be presented, e.g., color of a line, thickness of a line, color progression, etc.

Further, the presentation component 195 can include one or more components that can control how the various information is presented on the display 190. For example, owing to the shape of the earth, it is not a straightforward task to depict the earth's surface in a two dimensional (2D) space, and rather, various methods of presentation have been derived, e.g., Mercator's Projection. However, no method is perfect, for example, Mercator's Projection enables correct placement of lines of longitude, the lines of latitude become distorted and increases from the Equator to the poles, whereby the landmasses also become distorted as the distance from the Equator increases. Accordingly, to enable correct presentation of one or more trajectories on the 2D display 190, the presentation component 195 can utilize one or more algorithms 197 to depict a region correctly. For example, correct depiction of the longitude line and the latitude lines requires a different manipulation of the lines when displaying a first region located near the equator compared to a second region at the north pole. Hence a first algorithm in the algorithms 197 is utilized to depict the first region and a second algorithm in the algorithms 197 is utilized to depict the second region. The first algorithm and the second algorithm can be selected by the presentation component 195, as required. Further, the presentation component 195 can utilize one or more algorithms 197 to control/configure presentation of a trajectory on a display device (e.g., display 190), wherein the one or more algorithms 197 can compensate/adjust for a feature of the display device, e.g., a 2D screen having a flat profile, a 2D screen having a curved profile, a 3D display device, a spherical display device, etc.

Figure 2:
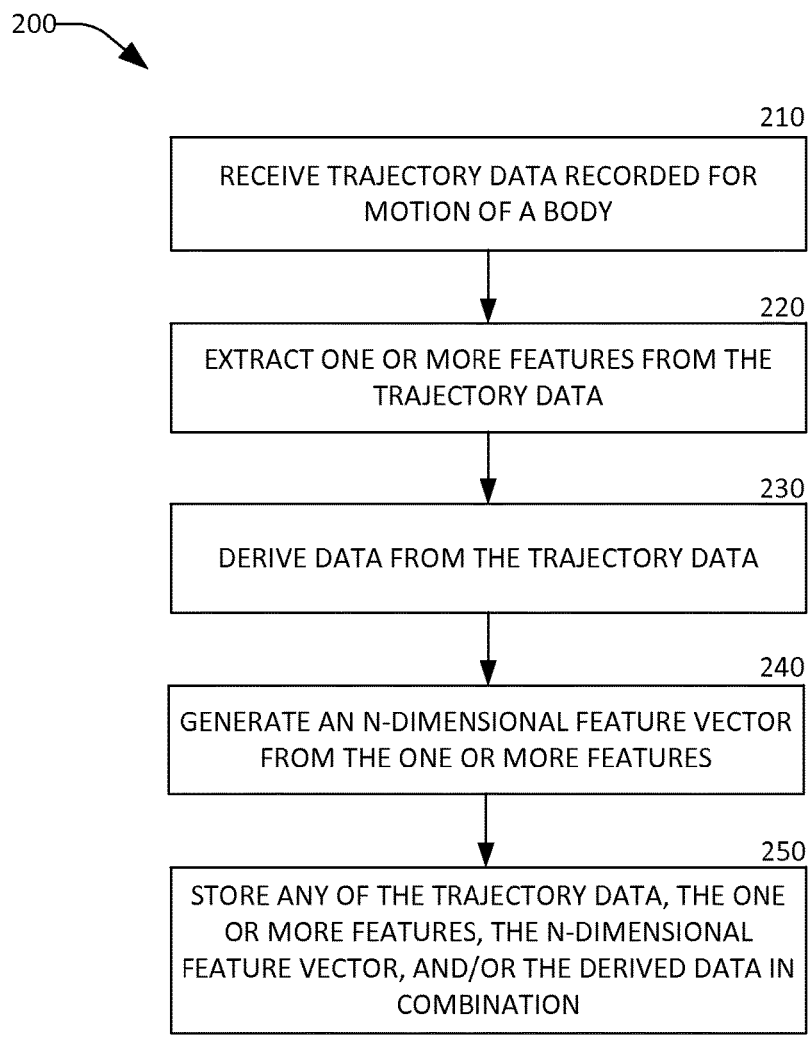
FIG. 2 is a flow diagram illustrating an exemplary methodology for forming a n-dimensional feature vector from trajectory data.
Figure 3:
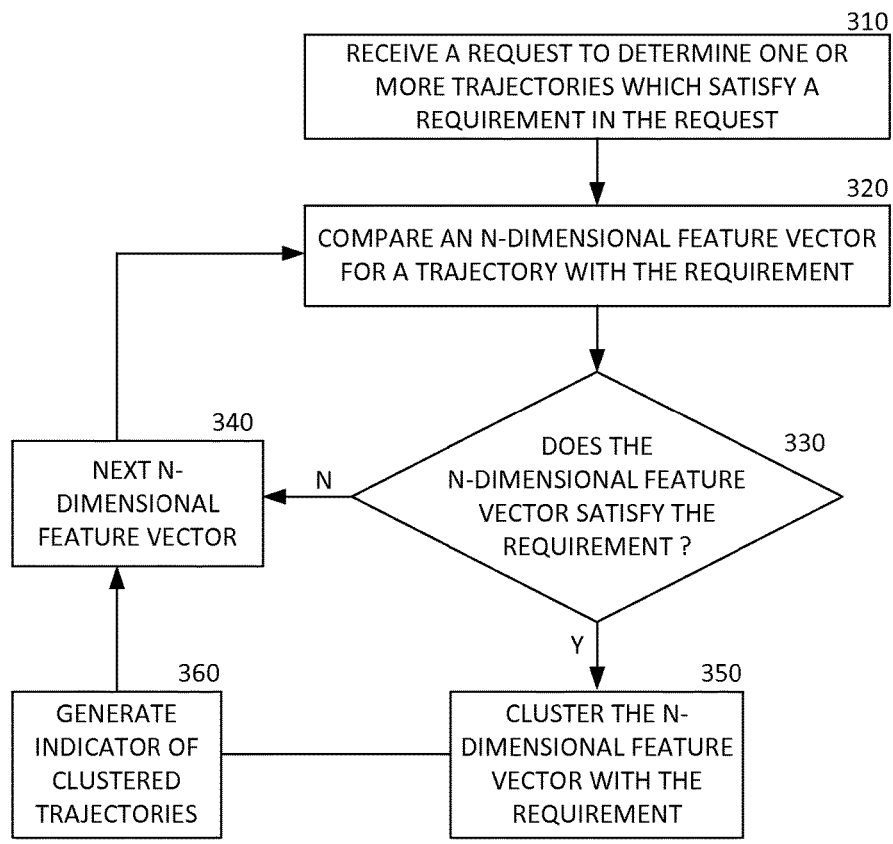
FIG. 3 is a flow diagram illustrating an exemplary methodology for clustering n-dimensional feature vectors and pertinent information.

FIGS. 2 and 3 illustrate exemplary methodologies relating generation of an n-dimensional feature vector from trajectory data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 2 illustrates a methodology 200 for generating an n-dimensional feature vector and any derived data from trajectory data. At 210, trajectory data relating to motion of a body can be received (e.g., at a computer system).

At 220, one or more features can be extracted from the trajectory data.

At 230, along with extracting various features from the trajectory data, other data can also be derived.

At 240, from the one or more features extracted from the trajectory data, an n-dimensional feature vector can be generated.

At 250, the trajectory data, the one or more features, the n-dimensional feature vector, and/or the derived data, can be stored in combination to enable subsequent analysis of the trajectory data, etc.

Now referring to FIG. 3, an exemplary methodology 300 that facilitates determining whether one or more trajectories match a requirement, and further, enabling matched trajectories to be clustered with the requirement.

At 310, a requirement is received. The requirement can include a n-dimensional feature vector with which the n-dimensional feature vector(s) generated in methodology can be compared with. The requirement can further include a criteria with which any of a feature(s), a derived data, etc., can be compared with.

At 320, per the previously mentioned example, a first n-dimensional feature vector is compared with the n-dimensional feature vector included in the requirement.

At 330, a determination is made regarding whether the first n-dimensional feature vector matches the n-dimensional feature vector included in the requirement.

At 340, in response to determining that the first n-dimensional feature vector does not match the requirement, the next n-dimensional feature vector can be selected for comparison with the n-dimensional feature vector in the requirement.

Returning to 330, in response to determining that the first n-dimensional feature vector matches (or is similar to) the n-dimensional feature vector in the requirement, at 350, the first n-dimensional feature vector can be "clustered" with the required n-dimensional feature vector, and accordingly, and trajectory data, derived data, and other information pertaining to the first n-dimensional feature vector can also be clustered with the first n-dimensional feature vector.

At 360, an indicator can be generated indicating that the first n-dimensional feature vector (and associated trajectory) has been clustered with the required n-dimensional feature vector. The methodology can proceed to the 340, wherein the the next n-dimensional feature vector can be selected for comparison with the n-dimensional feature vector in the requirement.

Figure 4:
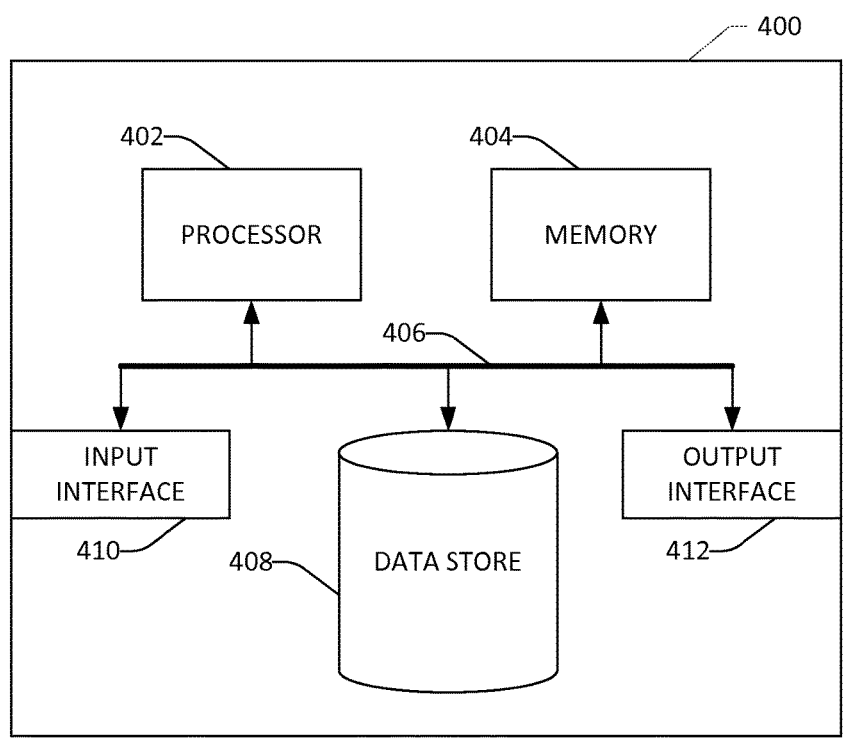
FIG. 4 illustrates an exemplary computing device.

Referring now to FIG. 4, a high-level illustration of an exemplary computing device 400 that can be used in accordance with the systems and methodology disclosed herein is illustrated. For example, the computing device 400 may be utilized to extract one or more features from trajectory data, generate a n-dimensional feature vector from the one or more features, and further compare the n-dimensional feature vector against search/clustering criteria. For example, the computing device 400 can operate as the computing system 130 and/or a portion thereof. The computing device 400 includes at least one processor 402 that executes instructions that are stored in a memory 404. The instructions may be, for instance, instructions for implementing functionality described as being carried out by one or more components discussed above or instructions for implementing one or more of the methods described above. The processor 402 may access the memory 404 by way of a system bus 406. In addition to storing executable instructions, the memory 404 may also store signatures, time-series signals, etc.

The computing device 400 additionally includes a data store 408 that is accessible by the processor 402 by way of the system bus 406. The data store 408 may include executable instructions, test signatures, standard signatures, etc. The computing device 400 also includes an input interface 410 that allows external devices to communicate with the computing device 400. For instance, the input interface 410 may be used to receive instructions from an external computer device, from a user, etc. The computing device 400 also includes an output interface 412 that interfaces the computing device 400 with one or more external devices. For example, the computing device 400 may display text, images, etc., by way of the output interface 412.

Additionally, while illustrated as a single system, it is to be understood that the computing device 400 may be a distributed system. Thus, for instance, several devices may be in communication by way of a network connection and may collectively perform tasks described as being performed by the computing device 400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
    a processor; and
    memory that stores instructions that, when executed by the processor, cause the processor to perform acts comprising:
        receiving trajectory data describing a trajectory of an airplane during a flight of the airplane, wherein the trajectory data comprises:
            positional coordinates that define locations of the airplane during the flight; and
            timestamps assigned to the positional coordinates that indicate times that the airplane was at the locations;
        generating an n-dimensional feature vector based upon the trajectory data, wherein the n-dimensional feature vector is representative of the trajectory of the airplane during the flight of the airplane, wherein the n-dimensional feature vector comprises values for n predefined features corresponding to the flight, wherein a value of the values for n predefined features corresponds to a maximum speed of the flight;
        storing the n-dimensional feature vector in a computer-readable data repository, wherein the computer-readable data repository comprises a plurality of n-dimensional feature vectors, the plurality of n-dimensional feature vectors in the computer-readable data repository represent trajectories of airplanes during flights of the airplanes;
        subsequent to storing the n-dimensional feature vector in the computer-readable data repository, receiving a search value of a feature in the n predefined features;
        searching the plurality of n-dimensional feature vectors based upon the received search value of the feature; and
        causing an identifier of the flight of the airplane to be displayed on a display based upon the searching to indicate that the flight of the airplane corresponds to the received search value of the feature.

2. The system of claim 1, wherein receiving the search value comprises receiving a second n-dimensional feature vector that is representative of a second trajectory of a second flight of a second airplane, the acts further comprising:
    comparing the second n-dimensional feature vector with the n-dimensional feature vector; and
    when it is determined that the second n-dimensional feature vector and the first n-dimensional feature vector are similar, clustering the flight of the airplane with the second flight of the second airplane.

3. The system of claim 2, the acts further comprising:
    retrieving the first n-dimensional feature vector; and
    in response to clustering the flight of the airplane with the second flight of the second airplane, causing a plot of the trajectory data to be displayed on the display.

4. The system of claim 3, the acts further comprising:
    correcting presentment of the plot of trajectory data by way of an algorithm to compensate for at least one of earth curvature or profile of the display upon which the trajectory data is being plotted.

5. The system of claim 2, to the acts further comprising:
    causing an indication that the second n-dimensional feature vector and the n-dimensional feature vector are not similar when it is determined that the second n-dimensional feature vector and the n-dimensional feature vector are not similar.

6. The system of claim 1, wherein the trajectory data is recorded from the flight of the airplane.

7. The system of claim 6, wherein the values for n predefined features of the flight signify one or more of an end-to-end distance of the flight, a total distance traveled, a starting point, an end point, a start timestamp, an end timestamp, a timestamp for duration of flight, average speed, aircraft identifier, climb rate, a centroid of points, a total curvature, a total turning average, curvature average, turning area of a convex hull of the points, aspect ratio of a convex hull, perimeter length of a convex hull, centroid of a convex hull, ratio of end-to-end distance vs. total distance traveled, radius of gyration of the points, or intratrajectory distance.

8. A method comprising:
    receiving trajectory data describing a trajectory of an airplane during a flight of the airplane, wherein the trajectory data comprises:
        positional coordinates that define locations of the airplane during the flight; and
        timestamps assigned to the positional coordinates that indicate times that the airplane was at the locations during the flight;
    generating an n-dimensional feature vector based upon the trajectory data, wherein the n-dimensional feature vector is representative of the trajectory of the airplane during the flight of the airplane, wherein the n-dimensional feature vector comprises values for n predefined features of the flight, wherein a value of the values for n predefined features corresponding to a maximum speed of the flight;
    storing the n-dimensional feature vector in a computer-readable data repository, wherein the computer-readable data repository comprises a plurality of n-dimensional feature vectors, the plurality of n-dimensional feature vectors in the computer-readable data repository represent trajectories of airplanes during flights of the airplanes;

subsequent to storing the n-dimensional feature vector in the computer-readable data repository, receiving a search value of a feature in the n predefined features;

searching the plurality of n-dimensional feature vectors based upon the received search value of the feature; and causing an identifier of the flight to be displayed on a display based upon the searching to indicate that the flight corresponds to the received search value of the feature.

9. The method of claim 8, wherein receiving the search value of the feature in the n predefined features comprises receiving a second n-dimensional feature vector that comprises the search value of the feature, the second n-dimensional feature vector represents a second trajectory of a second flight of a second airplane, the method further comprising:

comparing the second n-dimensional feature vector with the n-dimensional feature vector; and when the second n-dimensional feature vector and the n-dimensional feature vector are similar, clustering the flight of the airplane and the second flight of the second airplane.

10. The method of claim 9, further comprising:
causing a plot of the trajectory data to be displayed on the display.

11. The method of claim 10, further comprising receiving an instruction defining how the trajectory data is to be presented on the display, wherein the instruction defines at least one of thickness of a line depicting the trajectory data, a first color for depicting a first portion of the trajectory data, a second color for depicting a second portion of the trajectory data, or combination of the trajectory data with other trajectory data and how the combination of trajectory data is to be displayed with a heatmap graphical representation.

12. The method of claim 10, further comprising:
correcting presentment of the plot of trajectory data by way of an algorithm to compensate for at least one of curvature of the earth over which the trajectory data was collected or a profile of the display upon which the trajectory data is being presented.

13. A computer-readable storage medium comprising instructions that, when executed by a processor, cause the processor to perform acts comprising:

receiving trajectory data describing a trajectory of an airplane during a flight of the airplane, wherein the trajectory data comprises:

positional coordinates that define locations of the airplane during the flight; and timestamps assigned to the positional coordinates that indicate times that the airplane was at the locations;

generating an n-dimensional feature vector based upon the trajectory data, wherein the n-dimensional feature vector is representative of the trajectory of the airplane during the flight of the airplane, wherein the n-dimensional feature vector comprises values for n predefined features of the flight, wherein a value of the values for n predefined features corresponds to a maximum speed of the flight;

storing the n-dimensional feature vector in a computer-readable data repository, wherein the computer-readable repository comprises a plurality of n-dimensional feature vectors, the plurality of n-dimensional feature vectors in the computer-readable data repository represent trajectories of airplanes during flights of the airplanes;

subsequent to storing the n-dimensional feature vector in the computer-readable data repository, receiving a search request, the search request comprises a second n-dimensional feature vector that is representative of a second flight of a second airplane;

identifying the n-dimensional feature vector based upon a comparison between the n-dimensional feature vector and the second n-dimensional feature vector; and causing an identifier of the flight to be displayed on a display based upon the comparison between the n-dimensional feature vector and the second n-dimensional feature vector.

14. The computing device of claim 13, the acts further comprising
causing a plot of the trajectory data to be displayed on the display based upon the comparison.

* * * * *